US007825832B2

(12) United States Patent
Nishimura et al.

(10) Patent No.: US 7,825,832 B2
(45) Date of Patent: Nov. 2, 2010

(54) COORDINATE POSITION DETECTION DEVICE FOR TOUCH PANEL

(75) Inventors: Tomohiko Nishimura, Kyoto (JP); Takeshi Yamaguchi, Sakai (JP); Saburoh Miyamoto, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 166 days.

(21) Appl. No.: 12/278,826

(22) PCT Filed: Feb. 7, 2007

(86) PCT No.: PCT/JP2007/052078
§ 371 (c)(1),
(2), (4) Date: Aug. 8, 2008

(87) PCT Pub. No.: WO2007/091579
PCT Pub. Date: Aug. 16, 2007

(65) Prior Publication Data
US 2010/0026527 A1 Feb. 4, 2010

(30) Foreign Application Priority Data
Oct. 2, 2006 (JP) .............................. 2006-033334

(51) Int. Cl.
*H03M 1/22* (2006.01)
(52) U.S. Cl. ...................... 341/5; 345/179; 345/104; 345/173
(58) Field of Classification Search ............... 341/5; 345/179, 104, 173
See application file for complete search history.

(56) References Cited

U.S. PATENT DOCUMENTS

| 5,798,756 | A | * | 8/1998 | Yoshida et al. | ............... 345/179 |
| 5,854,881 | A | * | 12/1998 | Yoshida et al. | ............... 345/104 |
| 6,239,788 | B1 | * | 5/2001 | Nohno et al. | ............... 345/173 |
| 6,373,474 | B1 | * | 4/2002 | Katabami | ................... 345/173 |

FOREIGN PATENT DOCUMENTS

| JP | 2003-66417 | 3/2003 |
| JP | 2005-301974 | 10/2005 |

OTHER PUBLICATIONS

International Search Report for PCT/JP2007/052078, mailed April 10, 2007.

* cited by examiner

*Primary Examiner*—Jean B Jeanglaude
(74) *Attorney, Agent, or Firm*—Nixon & Vanderhye P.C.

(57) ABSTRACT

A coordinate position detection device includes: charging circuits having both the capability of charging a coupling capacitance in a capacitive-coupling touch panel with a position-detection resistive film whose potential periodically varies between a positive potential and a negative potential and the capability of restoring the charged coupling capacitance to its state prior to charging; current-to-voltage conversion circuits converting into a voltage the total amount of charging currents of the coupling capacitance after the charging circuits supply the charging current to the coupling capacitance a plurality of times; and a computation device detecting the coordinate position of a touched area based on the outputs of the current-to-voltage conversion circuits.

6 Claims, 6 Drawing Sheets

COORDINATE POSITION DETECTION DEVICE FOR TOUCH PANEL

This application is the U.S. national phase of International Application No. PCT/JP2007/052078, filed 7 Feb. 2007, which designated the U.S. and claims priority to Japan Application No. 2006-033334, filed 10 Feb. 2006, the entire contents of each of which are hereby incorporated by reference.

TECHNICAL FIELD

The present technology relates to a coordinate position detection device for use in a touch panel that detects the position of an area touched by a pen or a finger, and more particularly to a coordinate position detection device for use in a capacitive-coupling touch panel.

BACKGROUND AND SUMMARY

Figure 5:
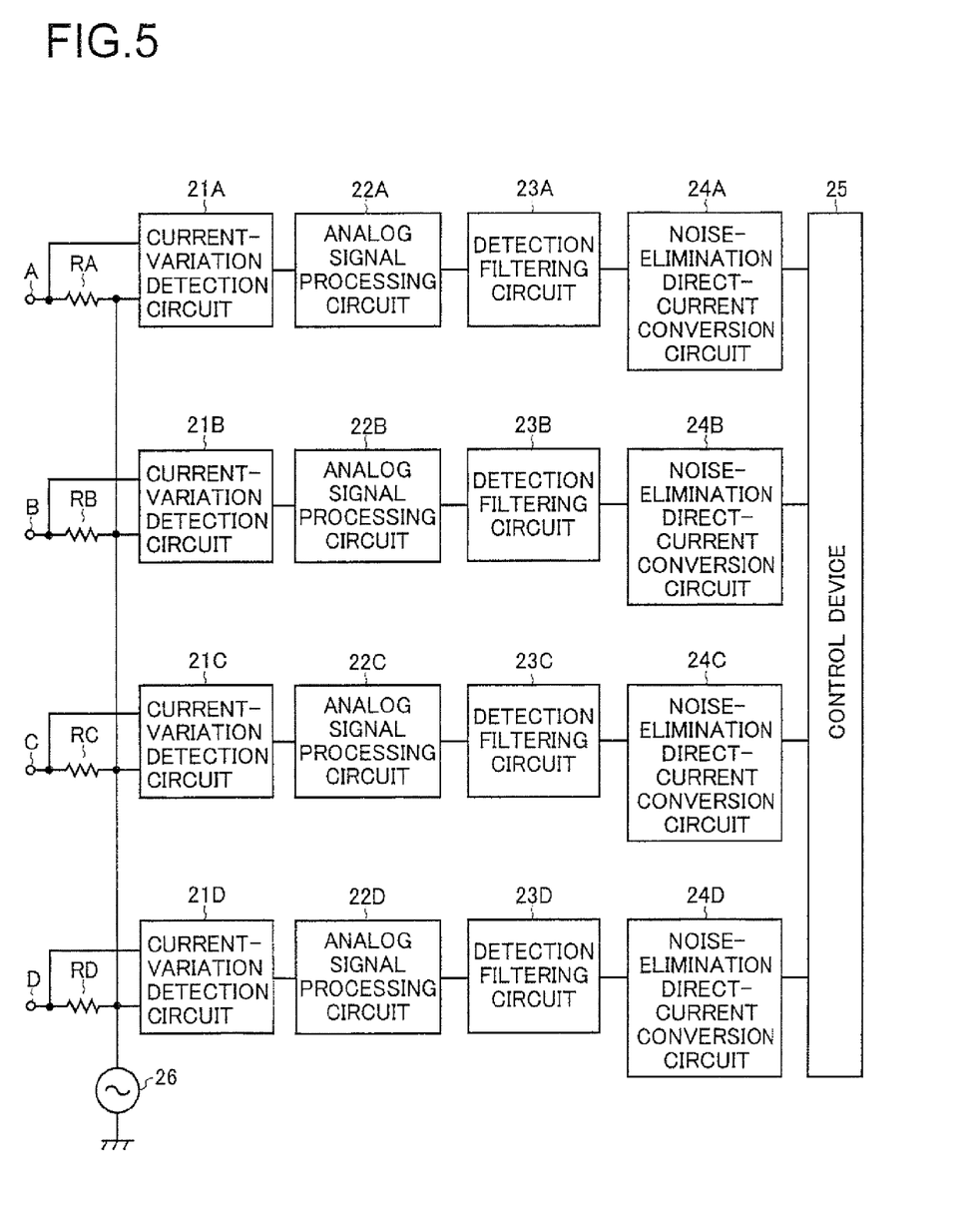
FIG. 5 A diagram schematically showing an example of the configuration of a conventional coordinate position detection device.

An example (see patent document 1) of the configuration of a conventional coordinate position detection device is schematically shown in FIG. 5. The conventional coordinate position detection device shown in FIG. 5 is a coordinate position detection device for use in a capacitive-coupling touch panel. The capacitive-coupling touch panel has a position-detection resistive film; electrodes A to D are formed in the four corners of the position-detection resistive film. The conventional coordinate position detection device shown in FIG. 5 is provided with resistors RA to RD, current-variation detection circuits 21A to 21D, analog signal processing circuits 22A to 22D, detection filtering circuits 23A to 23D, noise-elimination direct-current conversion circuits 24A to 24D, a control device 25 and an alternating-current power supply 26.

The current-variation detection circuits 21A to 21D detect variations in currents flowing between the electrodes A to D and ground when in the position detection mode. An alternating-current voltage is applied to the electrodes A to D by the alternating-current power supply 26. Thus, currents through the electrodes A to D caused by the touch of a finger or the like have an alternating-current component.

The outputs of the current-variation detection circuits 21A to 21D are amplified and band-pass filtered by the analog signal processing circuits 22A to 22D. The outputs of the analog signal processing circuits 22A to 22D are detected by the detection filtering circuits 23A to 23D, and are then fed to the noise-elimination direct-current conversion circuits 24A to 24D. The noise-elimination direct-current conversion circuits 24A to 24D convert the outputs of the detection filtering circuits 23A to 23D into direct currents to generate signals commensurate with the currents through the electrodes A to D, and feed the generated signals to the control device 25. The control device 25 detects the coordinate position of a touched area based on the outputs of the noise-elimination direct-current conversion circuits 24A to 24D.

When the conventional coordinate position detection device shown in FIG. 5 is in the position detection mode, an alternating-current voltage is constantly applied to the electrodes A to D by the alternating-current power supply 26. Thus, when the capacitive-coupling touch panel is touched by a finger or the like while in the position detection mode, an alternating current is constantly passed from the alternating-current power supply 26 via the finger or the like to ground. This disadvantageously results in increased power consumption.

The applicant of the present invention has already applied for a patent (Japanese Patent Application No. 2004-072073) on an invention that relates to a coordinate position detection device that can overcome such a disadvantage. The configuration of the coordinate position detection device proposed in this patent application is shown in FIG. 6.

Figure 6:
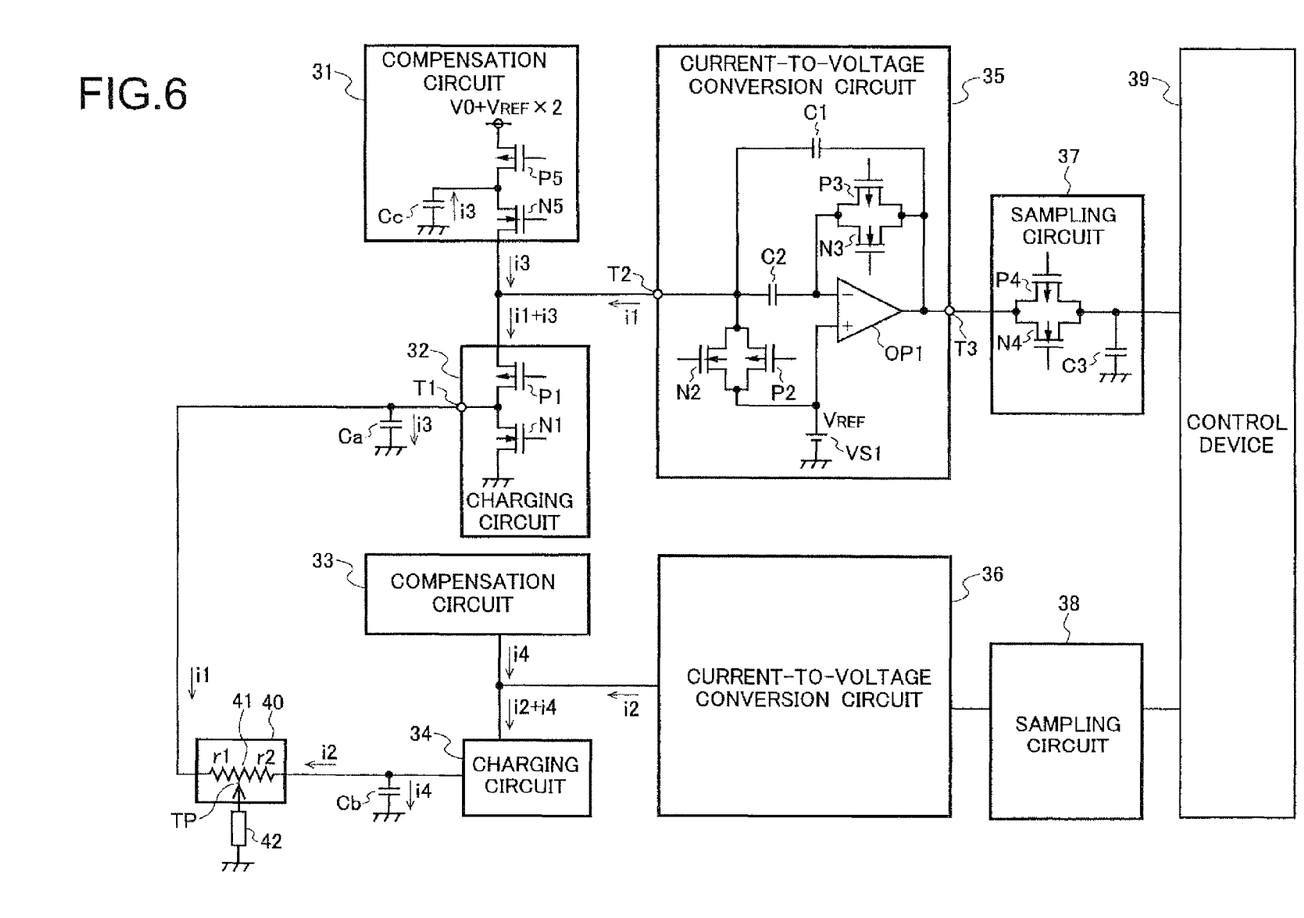
FIG. 6 A diagram schematically showing another example of the configuration of a conventional coordinate position detection device.

The coordinate position detection device shown in FIG. 6 is a coordinate position detection device for use in a capacitive-coupling touch panel 40. The capacitive-coupling touch panel 40 has a position-detection resistive film 41. Parasitic capacitances Ca and Cb are present in the capacitive-coupling touch panel 40.

The coordinate position detection device shown in FIG. 6 is provided with compensation circuits 31 and 33, charging circuits 32 and 34, current-to-voltage conversion circuits 35 and 36, sampling circuits 37 and 38 and a control device 39 that detects the coordinate position of a touched area based on the result of the sampling fed from the sampling circuits 37 and 38. For ease of explanation, in FIG. 6, a linear resistor is shown as the position-detection resistive film 41; however, in an actual touch panel, the position-detection resistive film 41 extending two-dimensionally works similar to the linear resistor.

A resistance r1 refers to a resistance between the position TP of an area touched by a finger or the like and the left end of the position-detection resistive film 41; a resistance r2 refers to a resistance between the position TP of the area touched by a finger or the like and the right end of the position-detection resistive film 41. An impedance 42 refers to an impedance (an impedance of a user touching the touch panel 40) between the position TP of the area touched by a finger or the like and ground. The ground potential is assumed to be V0 volts.

For ease of explanation, examples of the circuit configurations of circuit blocks in one system (the compensation circuit 31, the charging circuit 32, the current-to-voltage conversion circuit 35 and the sampling circuit 37) are only shown; the other system (the compensation circuit 33, the charging circuit 34, the current-to-voltage conversion circuit 36 and the sampling circuit 38) has the same circuit configurations. Hereinafter, a description will be given of the system (the compensation circuit 31, the charging circuit 32, the current-to-voltage conversion circuit 35 and the sampling circuit 37).

The charging circuit 32 has both the capability of charging a coupling capacitance (a capacitance formed by the touch of a finger or the like between the position-detection resistive film 41 and ground) and the capability of restoring the charged coupling capacitance to its state prior to charging. The charging circuit 32 has a P-channel MOS transistor P1 and an N-channel MOS transistor N1. The P-channel MOS transistor P1 and the N-channel MOS transistor N1 are turned on and off by control signals from the control device 39.

Before the start of charging of the coupling capacitance, the P-channel MOS transistor P1 is off, and the N-channel MOS transistor N1 is on. Thus, a voltage at a terminal T1 is V0 volts.

Thereafter, the P-channel MOS transistor P1 is turned on, and the N-channel MOS transistor N1 is turned off, and thus the voltage at the terminal T1 becomes equal to that at a terminal T2 in the current-to-voltage conversion circuit 35. Here, since the voltage at the terminal T2 is set at $V0+V_{REF}$ volts, the voltage at the terminal T1 becomes $V0+V_{REF}$ volts. Thus, a charging current i1 of the coupling capacitance is fed to the current-voltage conversion circuit 35 through the P-channel MOS transistor P1.

After the completion of sampling by the sampling circuit 37, the P-channel MOS transistor P1 is turned off, and the N-channel MOS transistor N1 is turned on. Thus, the charged coupling capacitance is restored to its state prior to charging, and it remains in this state.

The current-to-voltage conversion circuit 35 has both the capability of converting the charging current of the coupling capacitance into a voltage and the capability of restoring the voltage obtained by converting the charging current of the coupling capacitance to its state prior to charging. The current-to-voltage conversion circuit 35 has P-channel MOS transistors P2 and P3, N-channel MOS transistors N2 and N3, capacitors C1 and C2, an operational amplifier OP 1 and a voltage source VS1. The P-channel MOS transistors P2 and P3 and the N-channel MOS transistor N2 and N3 are turned on and off by control signals from the control device 39. The voltage source VS1 outputs a reference voltage $V_{REF}$.

Before the start of charging of the coupling capacitance by the charging circuit 32, the P-channel MOS transistors P2 and P3 and the N-channel MOS transistors N2 and N3 are on, and thus a voltage at the terminal T2 is set at V0+$V_{REF}$ volts, and a voltage across the capacitor C1 is set at 0 volts.

Thereafter, the P-channel MOS transistors P2 and P3 and N-channel MOS transistors N2 and N3 are turned off, and thus the voltage at the terminal T2 is kept at V0+$V_{REF}$ volts. When the charging of the coupling capacitance by the charging circuit 32 is started, the capacitor C1 is charged by the current i1 fed into the current-to-voltage conversion circuit 35. Thus, a voltage corresponding to charges in the charged capacitor C1 is outputted via a terminal T3.

After the completion of sampling by the sampling circuit 37, the P-channel MOS transistors P2 and P3 and the N-channel MOS transistors N2 and N3 are turned on. Thus, the voltage across the capacitor C1 is set at 0 volts, and the voltage outputted via the terminal T3 is restored to its state prior to the charging of the coupling capacity and it remains in this state.

The sampling circuit 37 samples the voltage obtained by converting the charging current of the coupling capacity, and the result of the sampling is fed to the control device 39. The sampling circuit 37 has a P-channel MOS transistor P4, an N-channel MOS transistor N4 and a capacitor C3. The P-channel MOS transistor P4 and the N-channel MOS transistor N4 are kept on while the sampling is performed, and are kept off while the sampling is not performed.

The compensation circuit 31 compensates for the effect of the parasitic capacitance Ca in the touch panel 40. The compensation circuit 31 has a P-channel MOS transistor P5, an N-channel MOS transistor N5 and a compensation capacitance Cc. A voltage of V0+$V_{REF}$×2 volts is applied to the source of the P-channel MOS transistor P5.

When the P-channel MOS transistor P1 in the charging circuit 32 is off, and the N-channel MOS transistor N1 in the charging circuit 32 is on, the voltage across the parasitic capacitance Ca in the touch panel 40 is 0 volts. At this time, the P-channel MOS transistor P5 in the compensation circuit 31 is on, and the N-channel MOS transistor N5 in the compensation circuit 31 is off, and this allows the compensation capacitance Cc to be charged. After the completion of the charging, the voltage across the compensation capacitance Cc is $V_{REF}$×2 volts.

When the P-channel MOS transistor P1 in the charging circuit 32 is on, and the N-channel MOS transistor N1 in the charging circuit 32 is off, the parasitic capacitance Ca in the touch panel 40 is charged. At this time, the P-channel MOS transistor P5 in the compensation circuit 31 is turned off, and the N-channel MOS transistor N5 in the compensation circuit 31 is turned on, and this allows the compensation capacitance Cc to be discharged. The voltage across the parasitic capacitance Ca after the completion of the charging and the voltage across the compensation capacitance Cc after the completion of the discharging are each $V_{REF}$ volts. Hence, when the parasitic capacitance Ca and the compensation capacitance Cc are set at the same capacitance, the charging current i3 of the parasitic capacitance Ca and the discharging current i3 of compensation capacitance Cc can be made equal in magnitude to each other. Thus, with the compensation capacitance Cc, it is possible to compensate for the effect of the parasitic capacitance Ca.

Since a voltage of V0+$V_{REF}$ volts is simultaneously applied to both the left and right ends of the position-detection resistive film 41 by the charging circuits 32 and 34, the ratio of the charging current i1 to the charging current i2 is expressed in equation (1) below.

$$i1:i2=r2:r1 \quad (1)$$

Since the ratio of a voltage $V_{35}$ outputted from the current-to-voltage conversion circuit 35 to a voltage $V_{36}$ outputted from the current-to-voltage conversion circuit 36 is equal to that of the charging current i1 to the charging current i2, equation (2) below holds true.

$$V_{35}:V_{36}=i1:i2=r2:r1 \quad (2)$$

Since equation (2) above holds true, the control device 39 can determine the ratio of the resistance r1 to the resistance r2 based on the result of the sampling fed from the sampling circuits 37 and 38, and can detect the coordinate position of a touched area from the ratio of the resistance r1 to the resistance r2.

The coordinate position detection device shown in FIG. 6 can detect the coordinate position of a touched area on a minimum of a single charge of the coupling capacitance. Thus, the relevant circuits are operated intermittently by keeping them off while the detection is not performed. In this way, it is possible to reduce power consumption as compared with the conventional coordinate position detection device shown in FIG. 5.

Patent document 1: JP-A-2003-066417 (paragraphs 0066 to 0068, FIG. 6)

In a case where the position-detection resistive film 41 in the touch panel 40 is disposed opposite an opposite conductive film (a conductive film opposite an active matrix substrate) in a liquid crystal panel, and an alternating-current voltage is applied to the opposite conductive film in the liquid crystal panel, however, the accuracy with which the coordinate position of a touched area is detected disadvantageously decreases in the coordinate position detection device shown in FIG. 6. Likewise, when the compensation circuit 31 shown in FIG. 6 is not used, the accuracy with which the coordinate position of a touched area is detected disadvantageously decreases. Such disadvantages will be described in detail below.

Figure 7:
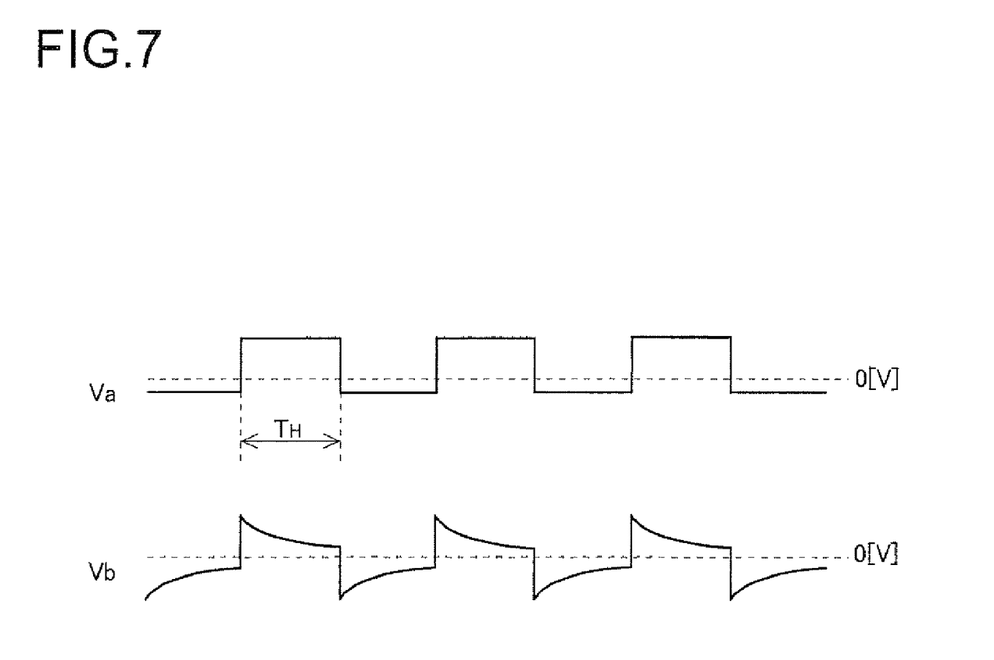
FIG. 7 A time chart for the potential at the opposite electrode in the liquid crystal display device and the potential at the position-detection resistive film in the touch panel.

In a case where a pulsed alternating-current voltage is applied to the opposite conductive film in the liquid crystal panel, as shown in FIG. 7, a potential Va at an opposite electrode varies per horizontal synchronization period $T_H$. Such variations in the potential Va at the opposite electrode produce an induced voltage in the position-detection resistive film 41 disposed parallel to the opposite electrode, with the result that a potential Vb at the position-detection resistive film 41 varies as shown in FIG. 7. When the potential Vb at the position-detection resistive film 41 varies in this way, the discharge current passed when the compensation capacitance Cc is discharged varies depending on the timing of discharge. Specifically, the amount of the current discharged from the compensation capacitance Cc when the potential at the position-detection resistive film 41 is positive is different from the amount of the current discharged from the compensation capacitance Cc when the potential at the position-detection resistive film 41 is negative. Consequently, the accuracy with which the coordinate position of a touched area is detected decreases.

A feature of an example embodiment presented herein is to provide a coordinate position detection device for use in a touch panel that can improve the accuracy with which the coordinate position of a touched area is detected even when the potential at a position-detection resistive film periodically varies.

To achieve the above feature, according to the present embodiment, a coordinate position detection device for use in a capacitive-coupling touch panel having a position-detection resistive film whose potential periodically varies between a first potential range (for example, positive) and a second potential range (for example, negative) is provided, and the coordinate position detection device includes: a current supply section passing a current through a coupling capacitance in the capacitive-coupling touch panel; a restoration section restoring the coupling capacitance having the current supplied thereto to its state prior to the supply of the current; a conversion section converting into a voltage a total amount of currents supplied by the current supply section to the coupling capacitance after the current supply section supplies the current to the coupling capacitance a plurality of times by repeating a current supply operation of the current supply section and a restoration operation of the restoration section; and a computation section detecting the position of a touched area based on the output of the conversion section. Here, the number of times that the current supply section supplies the current to the coupling capacitance when a potential at the position-detection resistive film falls within the first potential range is substantially equal to the number of times that the current supply section supplies the current to the coupling capacitance when the potential at the position-detection resistive film falls within the second potential range.

With this configuration, it is possible to reduce variations (for example, variations in a current discharged from a compensation capacitance if a compensation circuit is provided in the coordinate position detection device) attributable to the variation of the potential at the position-detection resistive film. This makes it possible to improve the accuracy with which the coordinate position of a touched area is detected even when the potential at the position-detection resistive film periodically varies. When a total of the number of times that the current supply section supplies the current to the coupling capacitance when the potential at the position-detection resistive film falls within the first potential range and the number of times that the current supply section supplies the current to the coupling capacitance when the potential at the position-detection resistive film falls within the second potential range is an odd number, the total number of times is preferably five or more. As the total number of times is increased, the ratio of the difference between the number of times that the current supply section supplies the current to the coupling capacitance when the potential at the position-detection resistive film falls within the first potential range and the number of times that the current supply section supplies the current to the coupling capacitance when the potential at the position-detection resistive film falls within the second potential range to the total number of times is increasingly reduced. Thus, it is possible to further improve the accuracy with which the coordinate position of a touched area is detected.

The number of times that the current supply section supplies the current to the coupling capacitance when the potential at the position-detection resistive film falls within the first potential range may be equal to the number of times that the current supply section supplies the current to the coupling capacitance when the potential at the position-detection resistive film falls within the second potential range.

With this configuration, it is possible to cancel out the variations attributable to the variation of the potential at the position-detection resistive film. This makes it possible to further improve the accuracy with which the coordinate position of a touched area is detected even when the potential at the position-detection resistive film periodically varies.

The current supply operation in which the current supply section supplies the current to the coupling capacitance when the potential at the position-detection resistive film falls within the first potential range and the current supply operation in which the current supply section supplies the current to the coupling capacitance when the potential at the position-detection resistive film falls within the second potential range may be performed alternately.

A period during which the potential at the position-detection resistive film falls within the first potential range may be equal to a period during which the potential at the position-detection resistive film falls within the second potential range.

When a point in time when the potential at the position-detection resistive film is shifted between the first potential range and the second potential range is a reference point, the current supply operation of the current supply section may be started with a predetermined timing from the reference point. Thus, the potential at the position-detection resistive film does not vary in each current supply operation, that is, it becomes stable. This makes it possible to further improve the accuracy with which the coordinate position of a touched area is detected. The current supply operation of the current supply section may be started immediately before the reference point, and the current supply operation of the current supply section may be completed at the reference point. Thus, variations in the potential at the position-detection resistive film are reduced during each current supply operation. This makes it possible to further improve the accuracy with which the coordinate position of a touched area is detected.

With a coordinate position detection device according to the present embodiment, it is possible to improve the accuracy with which the coordinate position of a touched area is detected even when the potential at a position-detection resistive film periodically varies.

LIST OF REFERENCE SYMBOLS

1 Liquid crystal panel
1A and 1F Glass substrate
1B TFT array layer
1C Liquid crystal layer
1D Opposite electrode layer
1E Color filter layer
1G First polarization plate
1H Second polarization plate
2 Touch panel
2A Touch panel substrate
2B Position-detection resistive film
3 Coordinate position detection device
11 and 13 Compensation circuit
12 and 14 Charging circuit
15 and 16 Current-voltage conversion circuit
17 Computation device
18 Switch control device
19 Impedance
C1 Compensation capacitance
C2 Capacitor
Ca and Cb Parasitic capacitance
OP1 Operational amplifier
SW1 to SW5 Switch
T1 and T2 Terminal
VS1 Voltage source Hereinafter, an embodiment will be described with reference to the accompanying drawings. A coordinate position detection device according to the example embodiment for use in a touch panel is preferably used in a capacitive touch panel in which a potential at a position-detection resistive film varies periodically. One example of the capacitive touch panel in which the potential at the position-detection resistive film varies periodically is a capacitive-coupling touch panel 2 for use in a liquid crystal panel provided with a capacitive touch panel shown in FIG. 1.

Figure 1:
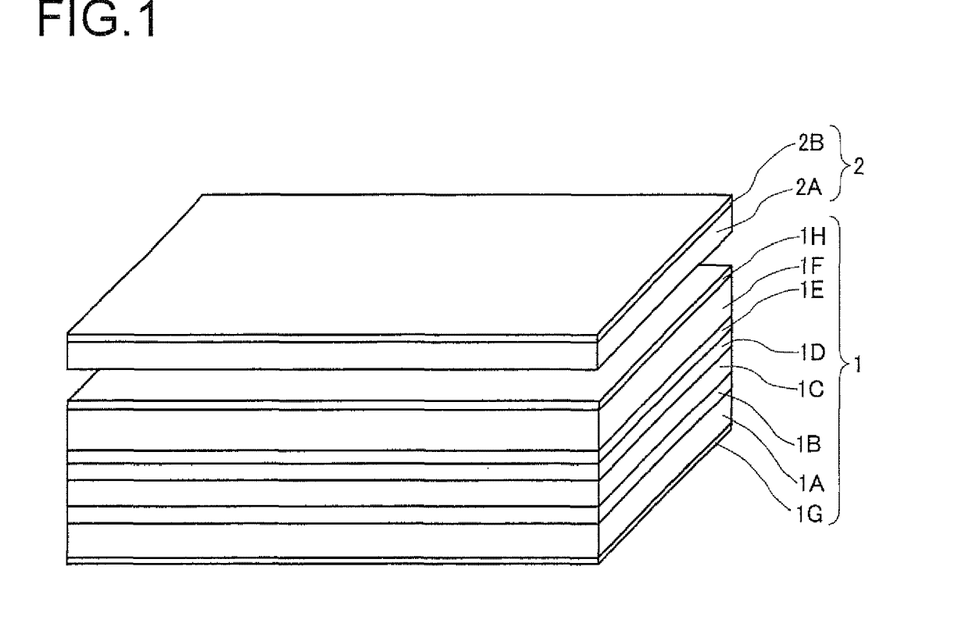
FIG. 1 A diagram showing the configuration of a liquid crystal display panel provided with a capacitive touch panel.

The liquid crystal panel provided with the capacitive touch panel shown in FIG. 1 is composed of a liquid crystal panel 1 and the capacitive-coupling touch panel 2. The liquid crystal panel 1 has, as seen from behind, a first polarization plate 1G, a glass substrate 1A, a TFT array layer 1B, a liquid crystal layer 1C, an opposite electrode layer 1D, a color filter layer 1E, a glass substrate 1F and a second polarization plate 1H. The capacitive-coupling touch panel 2 has, as seen from behind, a touch panel substrate 2A and a position-detection resistive film 2B formed by a transparent conductive film.

Figure 4:
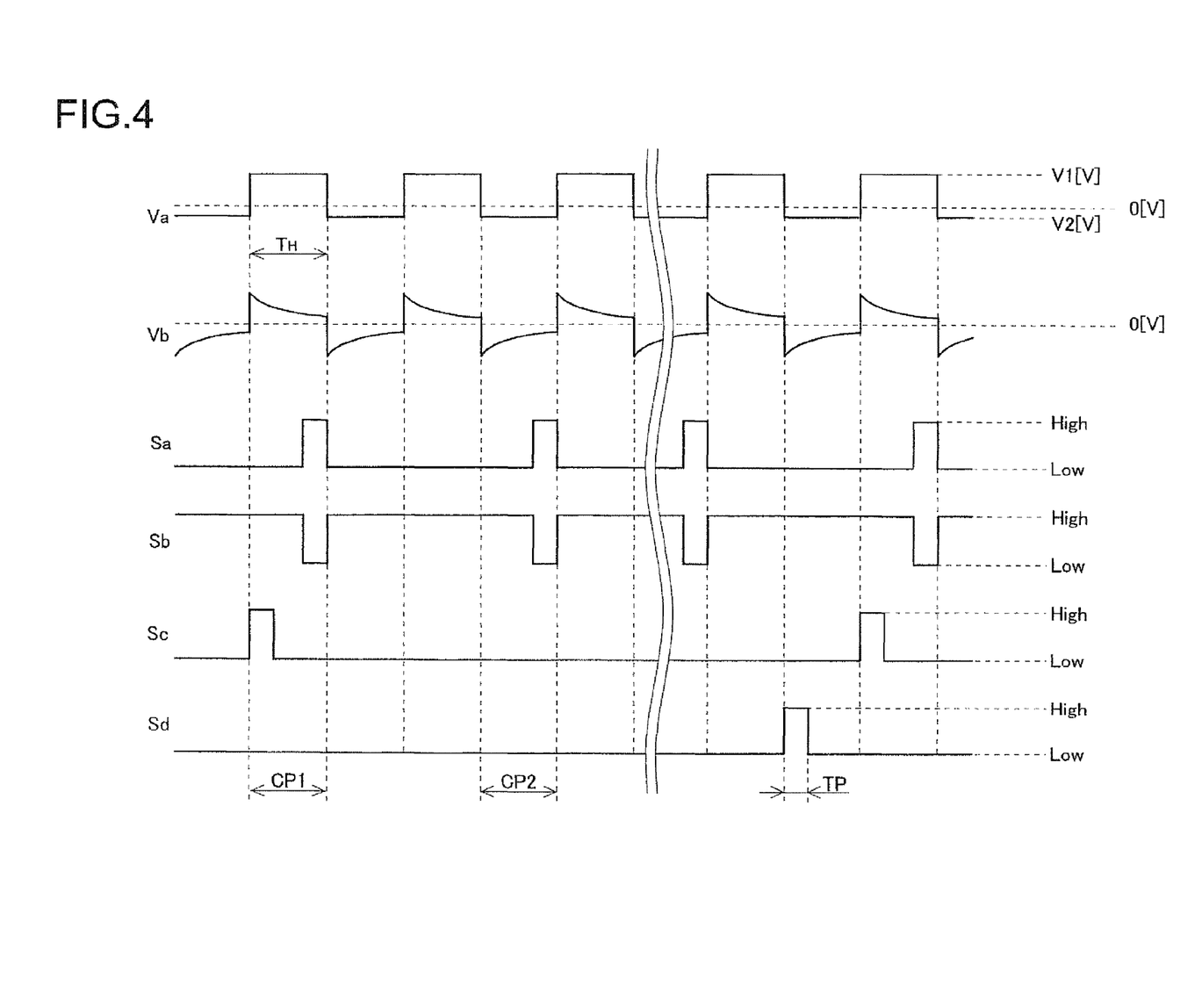
FIG. 4 A time chart for a potential at an opposite electrode in the liquid crystal panel, a potential at a position-detection resistive film in the touch panel and signal waveforms of relevant portions of the coordinate position detection device shown in FIG. 3.

In the liquid crystal panel provided with the capacitive touch panel shown in FIG. 1, since a pulsed alternating-current voltage is fed by a drive circuit (unillustrated) to the opposite electrode layer 1D in the liquid crystal panel 1, a potential Va at the opposite electrode layer 1D varies per horizontal synchronization period $T_H$ as shown in FIG. 4. Such variations in the potential Va at the opposite electrode layer 1D produce an induced voltage in the position-detection resistive film 2B, with the result that a potential Vb at the position-detection resistive film 2B varies as shown in FIG. 4.

Figure 2:
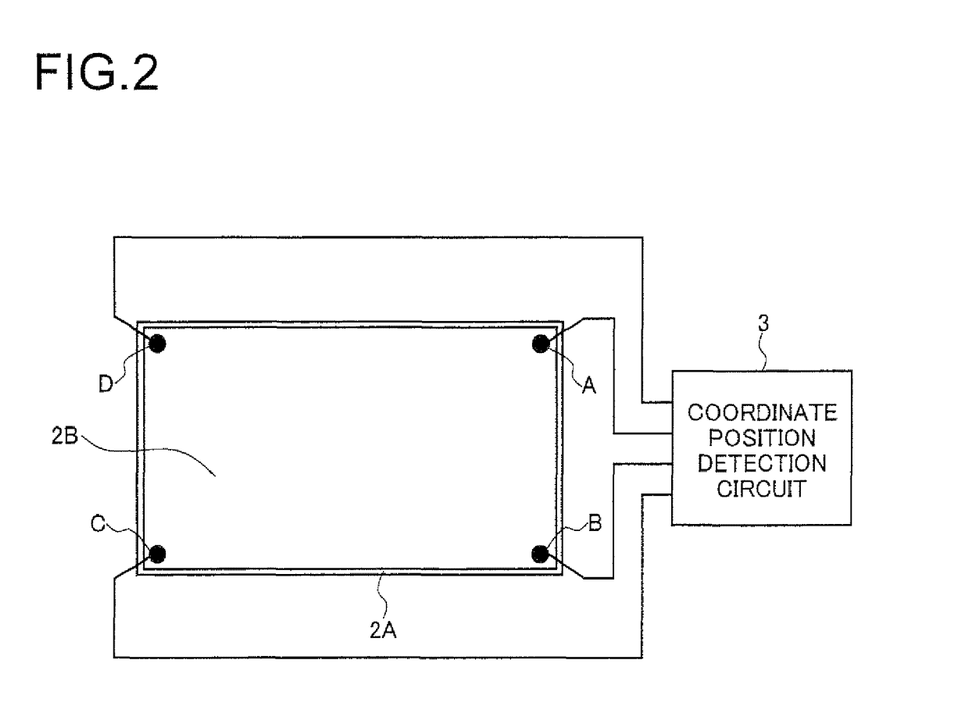
FIG. 2 A diagram showing how a capacitive-coupling touch panel is connected to a coordinate position detection circuit.

As shown in FIG. 2, electrodes A to D are formed in the four corners of the position-detection resistive film 2B in the capacitive-coupling touch panel 2, and the electrodes A to D are electrically connected to the coordinate position detection circuit 3 of the invention.

Figure 3:
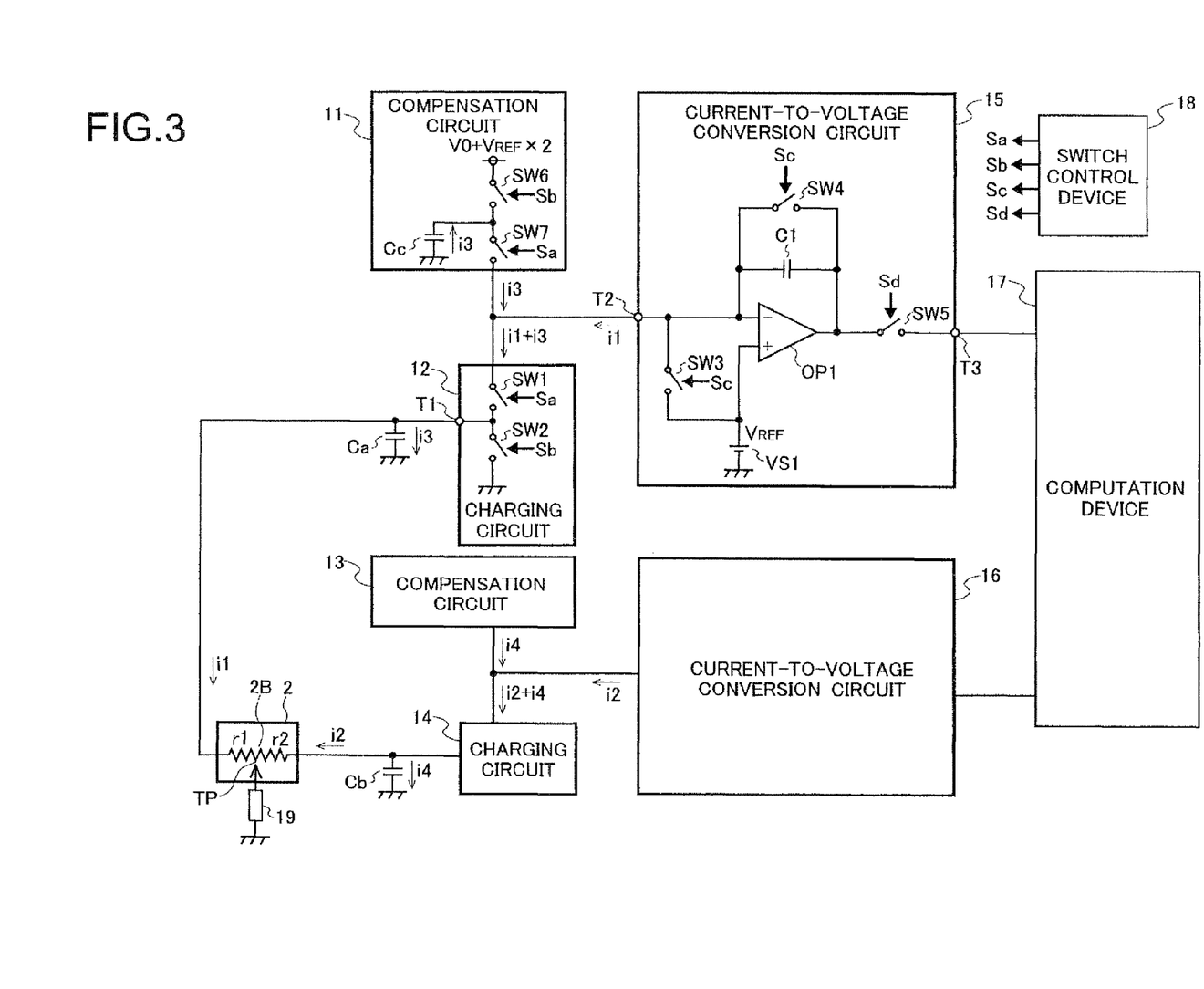
FIG. 3 A diagram schematically showing an example of the configuration of a coordinate position detection device according to an example embodiment.

An example of the configuration of the coordinate position detection device 3 of the invention for use in a touch panel is now schematically shown in FIG. 3. In FIG. 3, such parts as are found also in FIG. 1 are identified with common reference numerals.

The coordinate position detection device of the example embodiment shown in FIG. 3 is a coordinate position detection device for use in the capacitive-coupling touch panel 2. Parasitic capacitances Ca and Cb are present in the capacitive-coupling touch panel 2.

The coordinate position detection device of the example embodiment shown in FIG. 3 is provided with compensation circuits 11 and 13, charging circuits 12 and 14, current-to-voltage conversion circuits 15 and 16, a computation device 17 and a switch control device 18. The computation device 17 detects the coordinate position of a touched area based on voltages outputted from the current-to-voltage conversion circuits 15 and 16. The switch control device 18 receives information on the pulsed alternating-current voltage fed to the opposite electrode layer 1D (see FIG. 1) in the liquid crystal panel 1, and produces switch control signals Sa to Sd based on the information received to output the switch control signals Sa to Sd. For ease of explanation, in FIG. 3, a linear resistor is shown as the position-detection resistive film 2B; however, in the actual touch panel, the position-detection resistive film 2B extending two-dimensionally works similar to the linear resistor.

A resistance r1 refers to a resistance between the position TP of an area touched by a finger or the like and the left end of the position-detection resistive film 2B; a resistance r2 refers to a resistance between the position TP of the area touched by a finger or the like and the right end of the position-detection resistive film 2B. An impedance 19 refers to an impedance (an impedance of a user touching the capacitive-coupling touch panel 2) between the position TP of the area touched by a finger or the like and ground. The ground potential is assumed to be V0 volts.

For ease of explanation, examples of the circuit configurations of circuit blocks in one system (the compensation circuit 11, the charging circuit 12 and the current-to-voltage conversion circuit 15) are only shown; the other system (the compensation circuit 13, the charging circuit 14 and the current-to-voltage conversion circuit 16) has the same circuit configurations. Hereinafter, a description will be given of the system (the compensation circuit 11, the charging circuit 12 and the current-to-voltage conversion circuit 15) alone with reference to the configuration diagram of FIG. 3 and the time chart of FIG. 4.

The charging circuit 12 has both the capability of charging a coupling capacitance (a capacitance formed by a finger or the like between the position-detection resistive film 2B and ground) and the capability of restoring the charged coupling capacitance to its state prior to charging. The charging circuit 12 has switches SW1 and SW2. The switch SW1 is turned on and off by the control signal Sa from the switch control device 18; the switch SW2 is turned on and off by the control signal Sb from the switch control device 18.

The current-to-voltage conversion circuit 15 has both the capability of converting the charging current of the coupling capacitance into a voltage and the capability of restoring the voltage obtained by converting the charging current of the coupling capacitance to its state prior to charging. The current-to-voltage conversion circuit 15 has switches SW3 to SW5, a capacitor C1, an operational amplifier OP1 and a voltage source VS1. The switch SW3 is turned on and off by the control signal Sc from the switch control device 18; the switch SW4 is turned on and off by the control signal Sc from the switch control device 18; and the switch SW5 is turned on and off by the control signal Sd from the switch control device 18. The voltage source VS1 outputs a reference voltage $V_{REF}$.

The compensation circuit 11 compensates for the effect of the parasitic capacitance Ca in the touch panel 2. The compensation circuit 11 has switches SW6 and SW7 and a compensation capacitance Cc. A voltage of V0+$V_{REF}$×2 volts is applied to one end of the switch SW6.

The switches SW1 to SW5 are on when the control signals Sa to Sd are high; they are off when the control signals Sa to Sd are low.

Before the start of a first charging of the coupling capacitance, only the control signal Sb is high, and thus only the switches SW2 and SW6 are on. Hence, a voltage at a terminal T1 is V0 volts, and consequently the compensation capacitance Cc is charged. After the completion of the charging, a voltage across the compensation capacitance Cc is $V_{REF}$×2 volts. When the voltage at the terminal T1 is V0 volts, a voltage across the parasitic capacitance Ca in the touch panel 2 is 0 volts.

When the potential Va at the opposite electrode layer 1D (see FIG. 1) is V1 volts, the first charging of the coupling capacitance is performed.

In the beginning of a first charging period CP1, the control signals Sb and Sc are high, and the control signals Sa and Sd are low. Thus, the switches SW2, SW6, SW3 and SW4 are on, and the switches SW1, SW7 and SW5 are off. Hence, in the beginning of the first charging period CP1, the voltage at the terminal T1 is kept at V0 volts, the voltage at the terminal T2 is set at V0+$V_{REF}$ volts, the voltage across the capacitor C1 is set at 0 volts and the voltage across the compensation capacitance Cc is kept at $V_{REF}$×2 volts.

In the middle of the first charging period CP1, only the control signal Sb is high, and thus only the switches SW2 and SW6 are on. Hence, in the middle of the first charging period CP1, the voltage at the terminal T1 is kept at V0 volts, the voltage at the terminal T2 is kept at V0+$V_{REF}$ volts, the voltage across the capacitor C1 is kept at 0 volts and the voltage across the compensation capacitance Cc is kept at $V_{REF}$×2 volts.

In the end of the first charging period CP1, only the control signal Sa is high, and thus only the switches SW1 and SW7 are on. In the end of the first charging period CP1, since the switch SW1 is on, the voltage at the terminal T1 is equal to that at the terminal T2 in the current-to-voltage conversion circuit 15. Here, since the voltage at the terminal T2 in the current-to-voltage conversion circuit 15 is set at V0+$V_{REF}$ volts, the voltage at the terminal T1 is V0+$V_{REF}$, and thus the charging current i1 of the coupling capacitance is fed to the current-to-voltage conversion circuit 15 via the switch SW1. Since the switch SW1 is on, the parasitic capacitance Ca in the touch panel 2 is charged. Here, since the switch SW7 is also on, the compensation capacitance Cc in the compensation circuit 11 is discharged. The voltage across the parasitic capacitance Ca after the completion of the charging and the voltage across the compensation capacitance Cc after the completion of the discharging are each $V_{REF}$ volts. Hence, setting the parasitic capacitance Ca and the compensation capacitance Cc at the same capacitance allows the charging current i3 of the parasitic capacitance Ca to be equal to the discharging current i3 of the compensation capacitance Cc. Thus, it is possible to compensate for the effect of the parasitic capacitance Ca with the compensation capacitance Cc.

After the completion of the first charging period CP1, only the control signal Sb becomes high, and thus only the switches SW2 and SW6 turned on. Hence, the voltage at the terminal T1 becomes V0 volts, and consequently the compensation capacitance Cc is charged. Since the voltage at the terminal T1 is V0 volts, the coupling capacitance is restored to its state prior to charging. After the completion of the first charging period CP1, the charges produced by the first charging are stored in the capacitor C1.

After a lapse of two horizontal synchronization periods from the completion of the first charging period CP1, a second charging of the coupling capacitance is performed. Hence, when the potential Va at the opposite electrode layer 1D (see FIG. 1) is V2 volts, the second charging of the coupling capacitance is performed.

In the beginning of the second charging period CP2, the control signals Sb is high, and the control signals Sa, Sc and Sd are low. Thus, the switches SW2 and SW6 are on, and the switches SW1, SW7, SW3, SW4 and SW5 are off. Hence, in the beginning of the second charging period CP2, the voltage at the terminal T1 is kept at V0 volts, the charges produced by the first charging are stored in the capacitor C1 and the voltage across the compensation capacitance Cc is kept at $V_{REF}$×2 volts.

In the middle of the second charging period CP2, only the control signal Sb is high, and thus only the switches SW2 and SW6 are on. Hence, in the middle of the second charging period CP2, the voltage at the terminal T1 is kept at V0 volts, the charges produced by the first charging are stored in the capacitor C1 and the voltage across the compensation capacitance Cc is kept at $V_{REF}$×2 volts.

In the end of the second charging period CP2, only the control signal Sa is high, and thus only the switches SW1 and SW7 are on. In the end of the second charging period CP2, since the switch SW1 is on, the voltage at the terminal T1 is equal to that at the terminal T2 in the current-to-voltage conversion circuit 15. Here, since the voltage at the terminal T2 in the current-to-voltage conversion circuit 15 is set at V0+$V_{REF}$ volts, the voltage at the terminal T1 is V0+$V_{REF}$, and thus the charging current i1 of the coupling capacitance is fed to the current-to-voltage conversion circuit 15 via the switch SW1. Since the switch SW1 is on, the parasitic capacitance Ca in the touch panel 2 is charged. Here, since the switch SW7 is also on, the compensation capacitance Cc in the compensation circuit 11 is discharged. The voltage across the parasitic capacitance Ca after the completion of the charging and the voltage across the compensation capacitance Cc after the completion of the discharging are each $V_{REF}$ volts. Hence, setting the parasitic capacitance Ca and the compensation capacitance Cc at the same capacitance allows the charging current i3 of the parasitic capacitance Ca to be equal to the discharging current i3 of the compensation capacitance Cc. Thus, it is possible to compensate for the effect of the parasitic capacitance Ca with the compensation capacitance Cc.

After the completion of the second charging period CP2, only the control signal Sb becomes high, and thus only the switches SW2 and SW6 are turned on. Hence, the voltage at the terminal T1 becomes V0 volts, and consequently the compensation capacitance Cc is charged. Since the voltage at the terminal T1 is V0 volts, the coupling capacitance is restored to its state prior to charging. After the completion of the second charging period CP2, the charges produced by the first and second charging are stored in the capacitor C1.

After a lapse of two horizontal synchronization periods from the completion of the second charging period CP2, a third charging of the coupling capacitance is performed. Hence, when the potential Va at the opposite electrode layer 1D (see FIG. 1) is V1 volts, the third charging of the coupling capacitance is performed. Thereafter, the odd-numbered charging operations are performed in the same manner as the first charging operation, and the even-numbered charging operations are performed in the same manner as the second charging operation.

After a lapse of one horizontal synchronization period from the completion of an Nth (a natural number of two or more) charging period, during a transfer period TP where the control signal Sd becomes high, the switch SW5 is kept on, and thus a voltage corresponding to charges produced by the first to the Nth charging and stored in the capacitor C1 is outputted via the terminal T3. If the number of odd-numbered charging operations is equal to that of even-numbered charging operations, variations in the current discharged from the compensation capacitance Cc due to variations in the potential Vb at the position-detection resistive film 41 can be canceled out. Thus, the N is preferably an even number. If the number of odd-numbered charging operations is substantially equal to that of even-numbered charging operations, variations in the current discharged from the compensation capacitance Cc due to variations in the potential Vb at the position-detection resistive film 41 can be reduced. Thus, when the N is an odd number, the N is preferably a five or more.

Since a voltage of $V0+V_{REF}$ volts is simultaneously applied to both the left and right ends of the position-detection resistive film 2B by the charging circuits 12 and 14, the ratio of a total amount $\Sigma i1$ of the charging currents i1 to a total amount $\Sigma i2$ of the charging currents i2 is expressed in equation (3) below.

$$\Sigma i1 : \Sigma i2 = r2 : r1 \quad (3)$$

Since the ratio of a voltage $V_{15}$ outputted from the current-to-voltage conversion circuit 15 to a voltage $V_{16}$ outputted from the current-to-voltage conversion circuit 16 is equal to that of the total amount $\Sigma i1$ of the charging currents i1 to the total amount $\Sigma i2$ of the charging currents i2, equation (4) below holds true.

$$V_{15} : V_{16} = \Sigma i1 : \Sigma i2 = r2 : r1 \quad (4)$$

Since equation (4) above holds true, the computation device 39 can determine the ratio of the resistance r1 to the resistance r2 based on the voltage $V_{15}$ outputted from the current-to-voltage conversion circuit 15 and the voltage $V_{16}$ outputted from the current-to-voltage conversion circuit 16, and can detect the coordinate position of a touched area from the ratio of the resistance r1 to the resistance r2.

The coordinate position detection device according to the present embodiment and shown in FIG. 3 can detect the coordinate position of a touched area by charging the coupling capacitance a minimum of N times. Hence, by keeping relevant circuits in an off state while the detection is not performed and thus making the relevant circuits operate intermittently, it is possible to reduce power consumption as compared with the conventional coordinate position detection device shown in FIG. 5. In the coordinate position detection device according to the invention and shown in FIG. 3, the number of times that charging is performed when the potential Va at the opposite electrode layer 1D (see FIG. 1) is V1 volts can be made substantially equal to the number of times that discharging is performed when the potential Va at the opposite electrode layer 1D (see FIG. 1) is V2 volts. Thus, it is possible to improve the accuracy with which the coordinate position of a touched area is detected even when the potential at the position-detection resistive film periodically varies.

Even if the charging circuits 12 and 14 are replaced with discharging circuits that have both the capability of discharging the coupling capacitance and the capability of restoring the discharged coupling capacitance to its state prior to discharging, the polarities of voltages outputted from the current-to-voltage conversion circuits 15 and 16 are simply inverted. Thus, the charging circuits 12 and 14 may be replaced with the discharging circuits that have both the capability of discharging the coupling capacitance and the capability of restoring the discharged coupling capacitance to its state prior to discharging.

A coordinate position detection device according to the present embodiment can be applied to touch panels that detect the position of an area touched by a pen or finger.

The invention claimed is:

1. A coordinate position detection device for use in a capacitive-coupling touch panel having a position-detection resistive film extending two-dimensionally whose potential periodically varies between a first potential range and a second potential range, the coordinate position detection device comprising:
    a current supply section passing a current through a coupling capacitance in the capacitive-coupling touch panel;
    a restoration section restoring the coupling capacitance having the current supplied thereto to a state prior to the supply of the current;
    a conversion section converting into a voltage a total amount of currents supplied by the current supply section to the coupling capacitance after the current supply section supplies the current to the coupling capacitance a plurality of times by repeating a current supply operation of the current supply section and a restoration operation of the restoration section; and
    a computation section detecting a position of a touched area based on an output of the conversion section,
    wherein a number of times that the current supply section supplies the current to the coupling capacitance when a potential at the position-detection resistive film extending two-dimensionally falls within the first potential range is substantially equal to a number of times that the current supply section supplies the current to the coupling capacitance when the potential at the position-detection resistive film extending two-dimensionally falls within the second potential range.

2. The coordinate position detection device of claim 1, wherein the number of times that the current supply section supplies the current to the coupling capacitance when the potential at the position-detection resistive film falls within the first potential range is equal to the number of times that the current supply section supplies the current to the coupling capacitance when the potential at the position-detection resistive film falls within the second potential range.

3. The coordinate position detection device of claim 1, wherein the current supply operation in which the current supply section supplies the current to the coupling capacitance when the potential at the position-detection resistive film falls within the first potential range and the current supply operation in which the current supply section supplies the current to the coupling capacitance when the potential at the position-detection resistive film falls within the second potential range are performed alternately.

4. The coordinate position detection device of claim 1, wherein a period during which the potential at the position-detection resistive film falls within the first potential range is equal to a period during which the potential at the position-detection resistive film falls within the second potential range.

5. The coordinate position detection device of claim 1, wherein when a point in time when the potential at the position-detection resistive film is shifted between the first potential range and the second potential range is a reference point, the current supply operation of the current supply section is started with a predetermined timing from the reference point.

6. The coordinate position detection device of claim 5, wherein the current supply operation of the current supply section is started immediately before the reference point, and the current supply operation of the current supply section is completed at the reference point.

* * * * *